(12) United States Patent
Botterweck

(10) Patent No.: US 6,917,919 B2
(45) Date of Patent: Jul. 12, 2005

(54) SPEECH RECOGNITION METHOD

(75) Inventor: Henrik Botterweck, Aachen (DE)

(73) Assignee: Koninklijke Philips Electronics, N.V., Eindhoven (NL)

(*) Notice: Subject to any disclaimer, the term of this patent is extended or adjusted under 35 U.S.C. 154(b) by 457 days.

(21) Appl. No.: 09/961,954

(22) Filed: Sep. 24, 2001

(65) Prior Publication Data
US 2002/0120444 A1 Aug. 29, 2002

(30) Foreign Application Priority Data
Sep. 27, 2000 (DE) .......................................... 100 47 718

(51) Int. Cl.[7] .............................................. G10L 15/00
(52) U.S. Cl. ..................................... 704/255; 704/256
(58) Field of Search ................................ 704/255, 256, 704/257

(56) References Cited

U.S. PATENT DOCUMENTS

| | | | | |
|---|---|---|---|---|
| 5,864,810 A | * | 1/1999 | Digalakis et al. | ........... 704/255 |
| 6,151,575 A | * | 11/2000 | Newman et al. | ............ 704/260 |
| 6,327,565 B1 | * | 12/2001 | Kuhn et al. | ................. 704/255 |
| 6,341,264 B1 | * | 1/2002 | Kuhn et al. | ................. 704/255 |
| 6,343,267 B1 | * | 1/2002 | Kuhn et al. | ................. 704/222 |

OTHER PUBLICATIONS

Botterweck: "Anisotropic MAP defined by eigenvoices for large vocabulary continuous speech recognition" 2001 IEEE Internationa Conference on Acoustics, Speech, And Signal Processing. Proceedings (Cat. No. 01ch37221), May 7–11, 2001, vol. 1, pp. 353–356.

* cited by examiner

Primary Examiner—Daniel Abebe

(57) ABSTRACT

A speech recognition method is described in which a basic set of models is adapted to a current speaker on account of the speaker's already noticed speech data. The basic set of models comprises models for different acoustic units. The models are described each by a plurality of model parameters. The basic set of models is then represented by a supervector in a high-dimensional vector space (model space), the supervector being formed by a concatenation of the plurality of model parameters of the models of the basic set of models. The adaptation of this basic set of models to the speaker is effected in the model space by means of a MAP method in which an asymmetric distribution in the model space is selected as an a priori distribution for the MAP method.

14 Claims, 3 Drawing Sheets

SPEECH RECOGNITION METHOD

Figure 1:
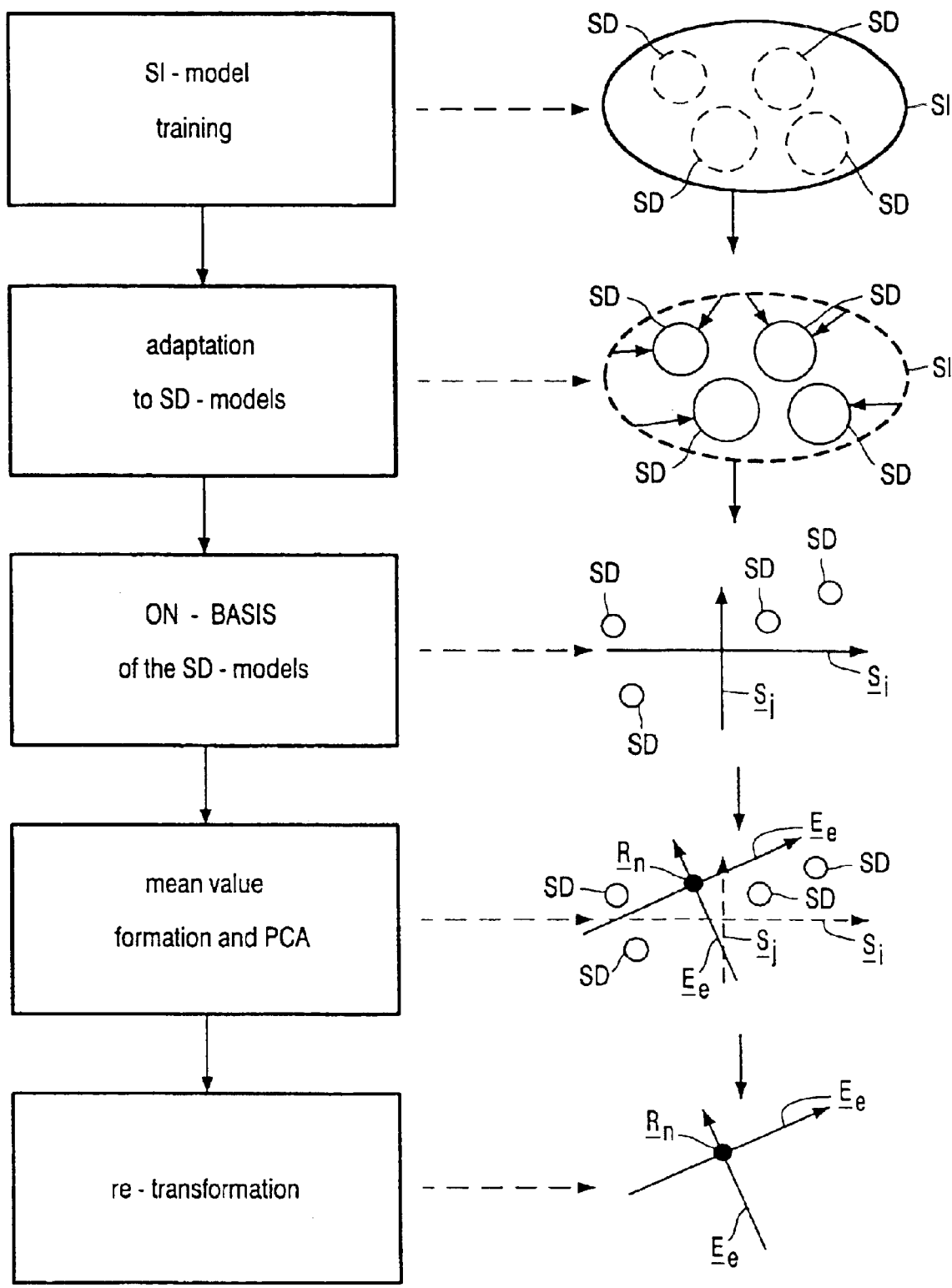

The invention relates to a speech recognition method in which a basic set of models is adapted to a current speaker on the basis of already observed speech data of this speaker. The set of models comprises models for different acoustic units, while the models are described by a plurality of model parameters.

Speech recognition systems usually work in the way that first the speech signal is spectrally or chronologically analyzed in an attribute analysis unit. In this attribute analysis unit the speech signals are usually divided into sections, so-called frames. These frames are then coded and digitized in suitable form for the further analysis. An observed signal may then be described by a plurality of different attributes or, in a multidimensional attribute space, by an "observation" vector or "attribute" vector. The actual speech recognition, i.e. the recognition of the semantic content of the speech signal, finally takes place in that the sections of the speech signal described by the observation vectors or by a whole sequence of observation vectors, respectively, are compared with models of different practically possible sequences of observations and thus a model is selected that matches best with the observation vector or sequence found. The speech recognition system is therefore to comprise a kind of library of all possible signal sequences from which the speech recognition system can then select the respectively matching signal sequence. That is to say, the speech recognition system contains a set of acoustic models for different acoustic units which could, in principle, practically occur in a speech signal. The acoustic units may be, for example, phonemes or phoneme-like units such as diphones or triphones, in which the model of the phoneme depends on the previous and/or subsequent phoneme within a context. Obviously, the acoustic units may also be complete words. Accordingly, such a set of models may consist of only models of phonemes, diphones, triphones or the like, of words or a mixture of different acoustic units.

A method often used for describing acoustic units i.e. certain sequences of observation vectors, is the use of so-called Hidden Markov models (HM-models). They are stochastic signal models for which it is assumed that a signal sequence is based on a so-called "Markov chain" of different states where certain transition probabilities exist between the individual states.

The respective states themselves cannot be recognized then (hidden) and the occurrence of the actual observations in the individual states is described by a probability density in dependence on the respective state. A model for a certain sequence of observations may therefore be described in this concept by the sequence of the various states passed through, by the duration of the stop in the respective states, the transition probability between the states and the probability of occurrence of the individual observations in the respective states. A model for a certain phoneme is then generated, so that first suitable start parameters are used for a model and then, in a so-called training of this model by a change, the parameter is adapted to the phoneme to be modeled of the respective language until an optimal model has been found. The details about the various HM-models, as well as the individual exact parameters to be adapted, do not play an essential role in the present invention and are therefore only described hereinafter insofar as they are necessary for providing a more complete understanding of the invention.

Models may be either speaker-dependent (so-called SD models) or speaker-independent (SI models). Speaker-dependent models are trained exactly to an individual speaker in that the speech recognition system is supplied with a large number of examples of words of the individual speaker beforehand, while the contents of these word examples are known to the system. These examples are called training data. Such speaker-dependent systems or models, respectively, are relatively exact for the respective individual for which it has been trained. However, they are extremely inexact for any other person. With a speaker-independent system, on the other hand, the training of the models takes place based on training data of a large variety of different speakers, to thus generate models with which the system is in a position to understand any person that speaks the respective language. The error rate in such a speaker-independent system when speech data are to be recognized of a speaker who does not belong to the training speakers, however, is about 20 to 25% higher than the error rate for a comparable speaker-dependent system, which was trained specifically for this speaker.

In many applications of speech recognition systems, for example, when used in automatic telephone answering systems, there is unfortunately no possibility of training the system or models, respectively, to a certain speaker beforehand. To improve the performance of such systems, many speech recognition systems have meanwhile the possibility of adapting the system to the speaker during speech recognition, on the basis of the speech data already observed. A simple possibility of this is to transform the observations to be recognized coming from the current speaker, so that they are closer to the observations of a reference speaker for which a speaker-dependent model was trained. A further possibility is to group the training speakers according to their similarity and train a common model for each group of similar speakers. For the respective current speaker the model of the group is then selected which the speaker fits in best.

A further, very good and effective method is the adaptation of a basic model to the respective speaker i.e. various parameters are changed, so that the changed model better matches the respective speaker. With this method a speaker-dependent model is formed during the speech recognition. The two best known model adaptation techniques are the so-called Maximum a Posteriori estimate (MAP) and the Maximum Likelihood Linear Regression method (MLLR).

With the customary MLLR method, a model is searched which has most probably generated the observations occurred so far. This method is relatively fast. However, it has the drawback that only the probability of the observation is maximized. Probabilities of observations not occurred thus far, i.e. phonemes not observed thus far, are discarded. Correlations between different phonemes are only coarsely taken into account by the common transformation of a plurality of models.

The so-called MAP method is a better adaptation strategy in this respect, because the observations occurred here are optimized while the knowledge of the probability distribution of the model parameters is taken into account. All the mean values of the probability densities of the various states move from their position in the basic model in the direction of the observed mean value in dependence on the number of the observations thus far. Even this method has the disadvantage, however, that correlations between various phonemes are not taken into account. Densities which are not observed are not transformed at all. The a priori distribution of all the mean density values is a product of independent distributions for the individual densities. Accordingly, a phoneme spoken at an extremely low voice

[α] does not automatically lead to a reduction of the model for the phoneme [o]. To come to a best possible result, according to the MAP method it is necessary to have both considerable computation power and time and, especially, a sufficient number of speech signals available of the new speaker with a maximum number of different phonemes.

It is an object of the present invention to provide an alternative to the known state of the art, which enables an extremely fast, but nevertheless optimal adaptation of the set of basic models to the respective speaker, also in the event of only few observed speech data.

This object is achieved by a method as claimed in claim 1. The dependent claims contain particularly advantageous further embodiments and versions of the method according to the invention.

With the method according to the invention, a set of basic models is represented by a supervector in a high-dimensional vector space, to be called model space hereinafter. This supervector is first formed by a concatenation of the plurality of model parameters of the models of the basic set of models. To adapt this basic set of models in a model space then, a MAP method is used and an asymmetric distribution in the model space is selected as an a priori distribution for the MAP method.

In the usual MAP method, the a priori distribution is a Gaussian distribution whose variance, the so-called MAP-"α" parameter, is roughly determined, which leads to a spherical-symmetrical Gaussian distribution in the high-dimensional model space. In lieu of this customary symmetrical Gaussian distribution, here, according to the invention, an asymmetrical distribution, preferably a Gaussian distribution, is used, which has different variances i.e. widths in different directions. As a result, it is possible to give the distribution certain preferred directions in the model space, which distribution is affected, for example, by the a priori knowledge of the variability of different speakers. For this purpose, preferably these preferred directions are assumed to be main axes of the distribution with a large variance, whereas all the directions perpendicular to these main axes have a predefined small or even dwindling variance. When the basic model is adapted to the respective speaker, this adaptation takes place relatively fast in the preferred direction or slowly or even not at all in any other direction.

The preferred directions are selected so that they represent the main direction in the model space along which different speakers can be distinguished from each other.

A possibility of determining such preferred directions is the formation of an eigenspace based on training speech data from a plurality of training speakers. The preferred directions are then selected so that they run along certain basis vectors of the eigenspace.

The formation of such eigenspace or so-called eigenvoice method, respectively, is shown in EP 0 984 429 A2. A starting point of the eigenvoice method described there is the representation of speakers and their combined acoustic models i.e. their sets of models, as elements of the model space. Here too all the parameters describing a speaker are first concatenated to a supervector, which defines a point in the model space. A linear transformation is then performed of these supervectors of the training speakers, by which transformation the eigenspace basis vectors are formed for the so-called eigenspace. This eigenspace is a linear subspace of the high-dimensional model space. The transformation is then effected in the way that the eigenspace basis vectors represent different correlation or discrimination attributes between the various training speakers or the models of the training speakers, respectively. A possibility of the transformation mentioned there is, for example, the Principal Component Analysis (PCA), in which a correlation matrix is formed from the supervectors of the various speakers and the eigenvectors of this correlation matrix are determined as eigenspace basis vectors. Further possible methods are the Linear Discriminant Analysis (LDA), the Factor Analysis (FA), the Independent Component Analysis (ICA) or the Singular Value Decomposition (SVD). The various transformations each utilize a reduction criterion which is based on the variability, for example, of the variance of the vectors to be transformed. Each eigenspace basis vector thus formed represents a different dimension in which individual speakers can be distinguished from each other. Furthermore, each supervector of each speaker can be described from the original training material by a linear combination of these basis vectors.

The various eigenspace basis vectors are preferably ordered according to their weight to distinguish different speakers. As a result, there is a possibility for the use in the speech recognition system to reduce the eigenspace even further, in that the most insignificant basis vectors of the eigenspace, which contain only little information by which speakers can be distinguished, are rejected. The dimension of the eigenspace recently used in a speech recognition may then be considerably smaller than the number of training speakers. Thus, few coordinates will be sufficient to characterize the individual speaker-dependent models of the training speakers in the thus provided a priori optimized eigenspace in the high-dimensional model space and to effect an adaptation to a new speaker. The number of the required coordinates is then only a fraction of the number of degrees of freedom of other adaptation methods such as, for example, MLLR. When the PCA method is used for determining the eigenvectors of the covariance matrix of the supervectors as eigenspace basis vectors, the evaluation of the eigenvectors may be effected on the basis of the associated eigenvalues. eigenvectors having higher eigenvalues are more significant than eigenvectors having lower eigenvalues.

With the method according to the invention the pre-analyzed knowledge about the mutual variability of the various training speakers, which knowledge is represented by means of the eigenspace, can be used as a priori knowledge for the adaptation, which adaptation reaches an optimum relatively rapidly, because, unlike said EP 0 984 429 A2, the adaptation is not performed in the way that the adapted model itself is to be in the eigenspace. In this manner also an optimal model will be found for speakers who have characteristics that widely differ from the various characteristics of the training speakers. This is to say, the method according to the invention directly leads to the optimal model and it is not necessary for finding the optimal model first to develop a model inside the eigenspace found and utilize this model as a new model for a further adaptation by means of a customary MAP or MLLR method. As a basic set of models is preferably used an average set of models of the various speaker-dependent sets of models of the training speakers. With such a basic model so far the best results have been obtained.

A problem for determining the eigenspace according to the method discussed in EP 0 984 429 A1 is formed by the conversion of this method to be used in the recognition of continuous speech with a large vocabulary. With such a speech recognition there are considerably more possibilities of successive phonemes and there is more often a wear of syllables etc. than when individual fixed commands are given. The real distribution of the observations is therefore too diffuse and there are too many variations. When HM-models are used, for example, an acoustic unit can no longer be described by a simple state or by a plurality of separate states which are described by only a single probability density, for example, a simple Gaussian or Laplace density. Instead, a mixture of various densities is necessary i.e. a plurality of such densities having different weights have to be superimposed to reach a probability density adapted to the real distribution.

If a language is started from that has 42 different phonemes, and if each of these phonemes is described by only three states per phoneme (initial state, middle state, end state), this will already lead to 142 different states which are to be described. When context-dependent phonemes are used, which is very practical when continuous speech is recognized, various context-dependent models are trained for each phoneme, depending on which phoneme immediately precedes and/or immediately succeeds (triphone). For describing such triphones of a language, a total of, for example, 2000 states are necessary. When a sufficient number of different probability densities per state (about 30) are used, there are about 60,000 different probability densities. With the customarily used attribute space of about 30 to 40 dimensions, this leads to a single speaker being described in the end by approximately two million individual model parameters. These model parameters comprise all the attribute parameters for describing 60,000 probability densities in the attribute space while, as a rule, only the mean value of each density is laid down in the attribute space and the variance for all the densities is assumed to be the same and constant. Obviously, for each density also additional parameters can be used, which individually determine the covariance for this density. Besides, the model parameters may comprise, for example, the transition probabilities between the states and further parameters for describing the various HM models. The approximately two million model parameters are then to be concatenated to the supervectors to be represented in the respectively dimensioned model space. The arrangement of the individual parameters is then to be paid attention to. In principle, the mutual ordering of the individual parameters is arbitrary, it is true, but it should be ensured that a once selected arrangement is the same for all the speakers. More particularly, also the arrangement of the individual attribute parameters, which describe the individual probability densities of a certain state, is to be chosen for all the speakers, so that the parameters of all the speakers are correlated optimally. Only in the case of a similar arrangement of all the parameters in the supervectors of the individual speakers is it ensured that the determined basis vectors of the eigenspace correctly represent the desired information to differentiate various speakers.

In the case of such a model space of close to two million dimensions, there is a further problem that in presently available computers the computational capacity and the main memory are not sufficient to determine eigenspace basis vectors at all according to said transformation method.

In a first step in a particularly preferred example of embodiment of the invented method of determining the eigenspace basis vectors, a common speaker-independent set of models for the training speakers is first developed to solve these problems, while the training speech data of all the training speakers involved are used. All the training speech data are then used for training respective speaker-independent models for the various acoustic units. Subsequently, in a second step, the training speech data of the individual training speakers are used for adapting the speaker-independent set of models found to the respective training speakers. This adaptation may be effected, for example, with the usual methods such as MAP or MLLR. When the models of the common speaker-independent sets of models are adapted to the models of the speaker-dependent sets of models of the individual speakers, the respective significance contents of the speech data are known. This is a so-called supervised adaptation. With this adaptation it can be detected without any problem which model parameters of the models of the speaker-independent sets of models are assigned to the individual model parameters of the respective models of the speaker-dependent sets of models, so that also an unambiguous mutual assignment of the parameters can be determined. The concatenation of the individual model parameters of the sets of models to the supervectors is then effected in such manner that the model parameters of the models of the speaker-dependent sets of models, which are assigned to the same model parameters of the same model of the speaker-independent common sets of models, are also arranged at the respective identical positions of the respective supervectors. Thus, also with an extremely high number of different parameters, for example, with several million parameters, an unambiguous arrangement of the individual parameters in the supervectors is guaranteed. The method is particularly suitable for developing eigenspaces for speech systems that work on the basis of the Hidden Markov models mentioned in the introduction. In principle, such a method, however, may also be used with other models with which the matter is to concatenate a multitude of parameters, to supervectors in a systematic manner, to thus represent the different speakers as dots in a high-dimensional model space.

In addition, for determining the basis vectors of the eigenspace, the high-dimensional model space is first reduced to a speaker sub-space via a simple change of basis, in which sub-space the supervectors of all the training speakers are arranged. The actual transformation for determining the eigenspace basis vectors is then performed in this speaker sub-space. Subsequently, the eigenspace basis vectors found are retransformed into the model space in a simple manner. Such a simple change of basis is possible, for example, by a Gram-Schmidt orthonormalization of the supervectors themselves or, preferably, by such an orthonormalization of the difference vectors of the supervectors to a chosen original vector. A mean supervector is then preferably used as an original vector. This is the supervector whose parameters are the respective mean values of the parameters of the individual speaker-dependent supervectors. Such a simple change of basis can be performed in suitable manner also in high-dimensional spaces on current computers without any problem. To represent n different speakers in this speaker sub-space, the speaker sub-space is to have a maximum dimension of n−1 i.e. the dimensions of the space in which then the actual calculation of the basis vectors of the eigenspace is performed, are strongly reduced compared with the original model space, so that considerable computing speed and memory capacity is saved.

The thus determined eigenspace basis vectors are then chosen to be preferred directions for the Gaussian distribution. For this purpose, the eigenspace basis vectors are adopted as main axes of the distribution with a large variance, against which all the directions perpendicular to these main axes have a predefined small or even dwindling variance. When the basis model is adapted to the respective speakers, this adaptation takes place relatively rapidly in the direction of the eigenspace basis vectors and slowly or not at all in any other direction.

This method is particularly fast when the eigenspace basis vectors were previously arranged in dependence on their significance for distinguishing different speakers, and only the most significant ones of the determined eigenspace basis vectors, for example, only the ten or fifty most significant basis vectors, are used for spreading out the eigenspace in the end used for the further adaptation. The variance of the a priori distribution along the basis vectors used can then moreover be chosen in dependence on the significance, so that the adaptation along the various eigenspace basis vectors also takes place with different speed. Obviously, there is also the possibility of classifying the eigenspace basis vectors and, for example, assigning to the most significant eigenspace basis vectors their individual variances which correspond to their significance and assigning a certain variance to all remaining basis vectors, which certain variance is smaller than the smallest variance of the chosen most significant basis vectors. An even smaller or dwindling variance is then assigned to all further directions.

With the method according to the invention, a robust and generally applicable speaker adaptation is possible within the first seconds or even the first spoken phonemes of a continuous, unknown speech signal. The prevailing computational circuitry is to be used only once for processing the training speech material and for finding the eigenspace, while this computational circuitry itself with continuous speech recognition with a large vocabulary can be governed without any problem based on the effectuation of a change of basis to reduce the parameter space to a sub-space. In this manner the eigenspace can be efficiently formed without a direct use of the millions of parameters. Here it is pointed out once again that the use of eigenspace basis vectors as preferred directions is an extremely suitable method of reaching a fast adaptation by means of the method according to the invention. Obviously, however, any preferred directions may be chosen for the method, and the preferred directions can also be determined in any other suitable manner. Decisive, however, is that the a priori distribution is not spherical-symmetrical, but indicates in a practical manner an asymmetry which is a better reflection of the real conditions than a simple spherical symmetrical distribution.

The invention will be further explained with reference to the appended drawing Figures based on example of embodiment. The characteristic attributes discussed hereinafter and the attributes already described above may be of essence to the invention not only in said combinations, but also individually or in other combinations.

Figure 2:
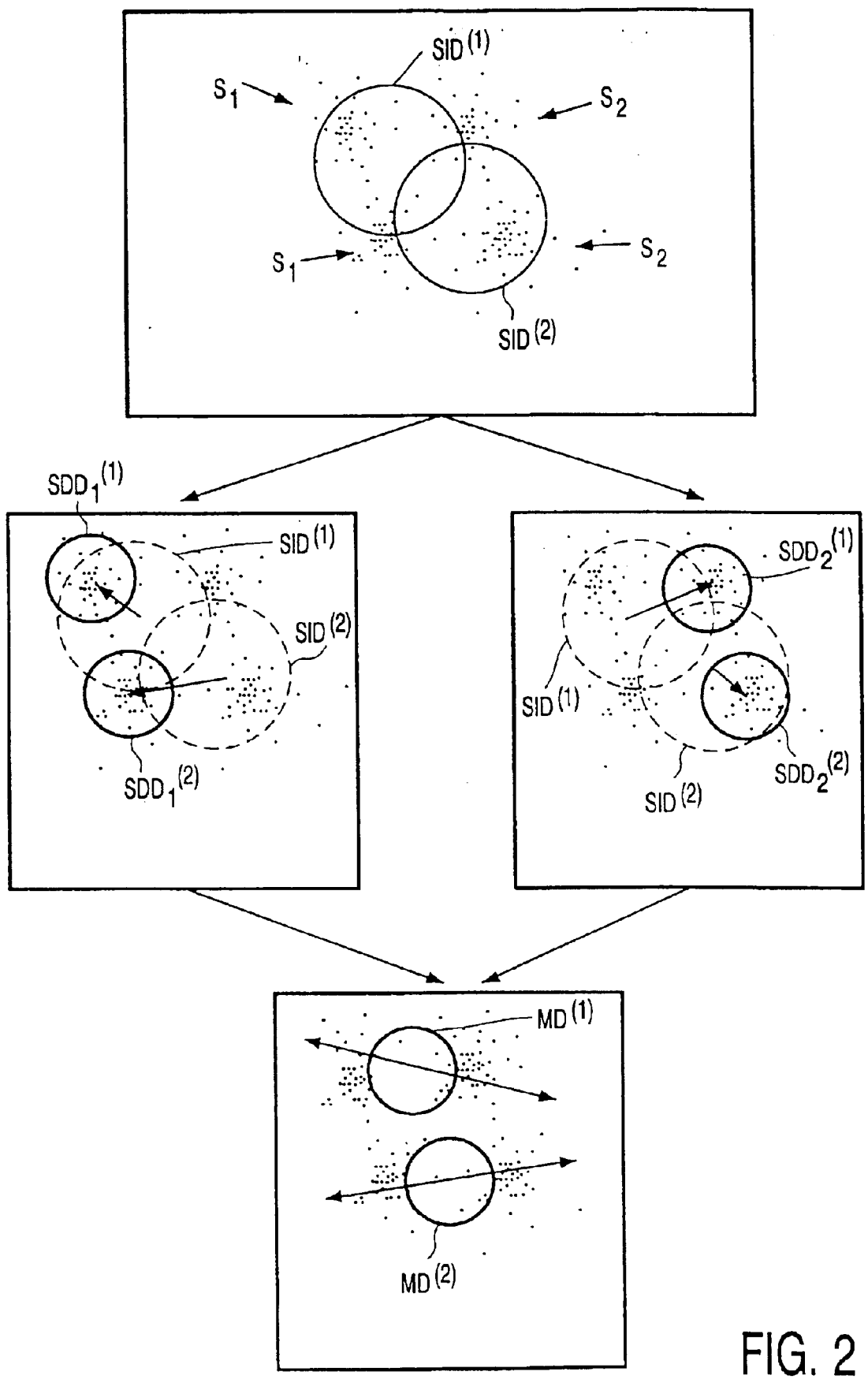
Figure 3:
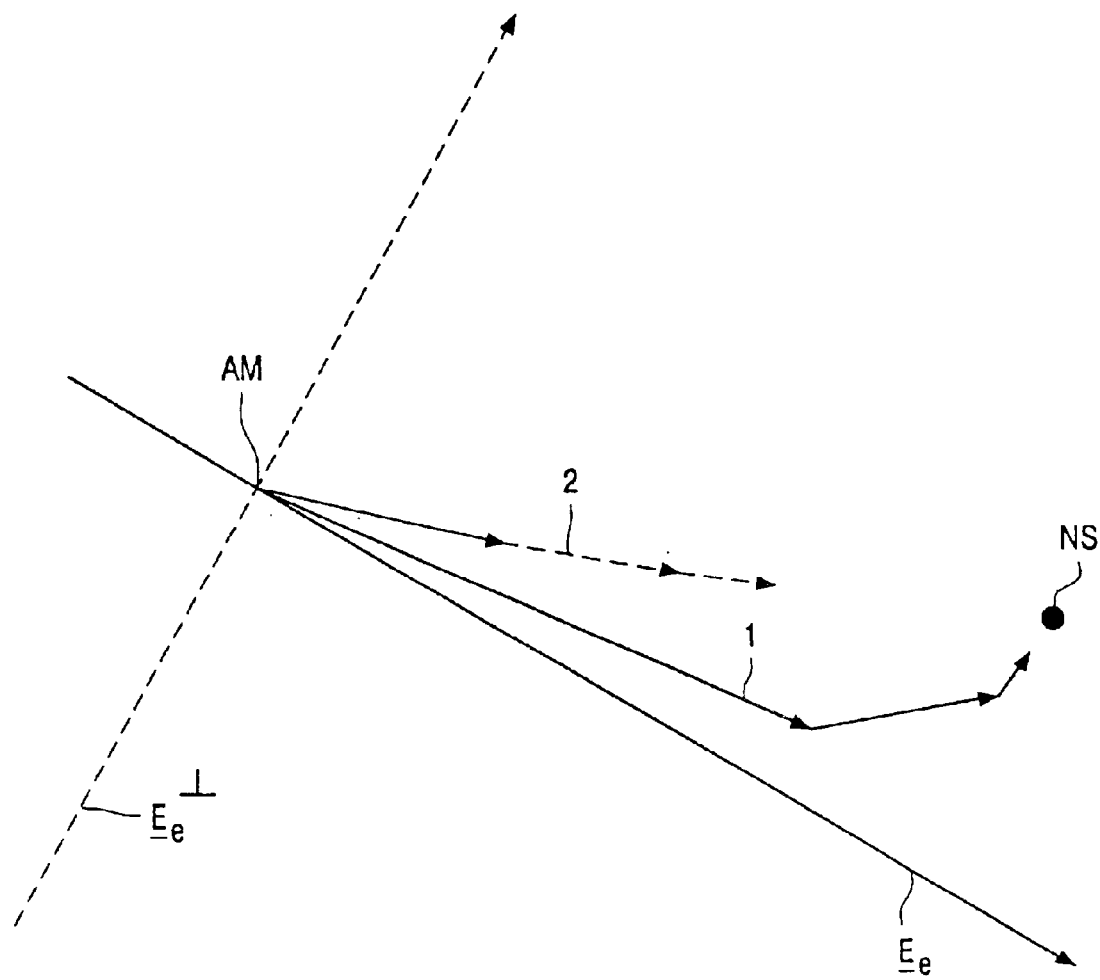

In these drawings:

FIG. 1 gives a diagrammatic representation of the order of the various steps of the method according to the invention for generating an eigenspace, FIG. 2 is an illustration of the adaptation of a speaker-independent model to two different speakers, FIG. 3 is a diagrammatic graphical representation of the adaptation steps for an adaptation of a basic model to a new speaker according to the conventional MAP method (curve 2) and to the more general MAP method according to the invention, which utilizes the eigenspace (curve 1).

In the example of embodiment for implementing the method shown in FIG. 1 for the recognition of continuous speech with a large vocabulary, first an eigenspace is formed in the following manner on the basis of the training speech data of a multitude of training speakers, here 300 speakers. The method commences in that the whole speech data material of the training speakers is used for training a common speaker-independent set of models with different speaker-independent models SI for the different acoustic units.

Such a speaker-independent model SI for an acoustic unit is shown in a solid-line elliptical distribution in the first step. In reality, this is a model consisting of three states, which are described by a plurality of probability densities. These densities are again described by 33 acoustic attribute parameters, which are each the mean value of the probability densities in the attribute space. In the following example of embodiment, 16 mel-cepstral coefficients and their 16 first time derivatives are used as attributes. The second derivative of the energy i.e. of the $0^{th}$ mel-cepstral coefficient is added as the $33^{rd}$ attribute. Obviously, such a model may also be described by fewer parameters, or by even further additional parameters, for example, the variances of the density distributions.

In a second step, these speaker-independent models SI are adapted to the individual speakers while the respective training material of the training speakers is used, i.e. speaker-dependent models SD are generated. In the example of embodiment shown in FIG. 1 the speaker-independent model SI is adapted to four different speakers.

In FIG. 2 the method is clarified a little more with reference to an example having only two training speakers $S_1$, $S_2$. The dots correspond to respectively occurred observations of a specific acoustic unit, which was spoken by the two training speakers $S_1$, $S_2$. This is a representation in an attribute space which here has only two dimensions for clarity. Customarily, however, a single observation is not described by two, but by a multitude—in the present example of embodiment as stated, 33-different attribute parameters. The attribute space is therefore in the present actual example of embodiment not two-dimensional as shown in FIG. 2, but 33-dimensional.

As may be noticed, the individual observations of the specific acoustic unit for the two speakers $S_1$, $S_2$ is spatially divided over wide areas while, in the case shown, for the two speakers $S_1$, $S_2$ two local maximums have clearly been formed. In one model this acoustic unit cannot therefore be sufficiently well formed with a single Gaussian probability density, but a superpositioning of at least two probability densities is to be used to represent the two maximums in the real spatial distribution of the observations. In reality the distribution of the observations is usually even more diffuse, so that for a good modeling about 30 probability densities are superimposed.

To determine what density of a model for a certain acoustic unit of a certain speaker corresponds to what density of the respective model for the same acoustic unit of another speaker, first a common speaker-independent model is trained from all the training speech data. In FIG. 2 this model has exactly two speaker-independent Gaussian probability densities $SID^{(1)}$, $SID^{(2)}$. In a next step this speaker-independent model is then adapted to the two individual speakers $S_1$, $S_2$, while the known training speech material of the two individual speakers $S_1$, $S_2$ can be used. This leads to a speaker-dependent model having two probability densities $SDD^{(1)}_1$, $SDD^{(2)}_1$ for the first speaker SI and to another speaker-dependent model having two probability densities $SDD^{(1)}_2$, $SDD^{(2)}_2$ for the second speaker $S_2$. Since the models were developed from the same speaker-independent start model, the assignment of the probability densities is clear; the probability densities $SDD^{(1)}_1$, $SDD^{(2)}_1$, $SDD^{(1)}_2$, $SDD^{(2)}_2$ of the two speakers $S_1$, $S_2$, which densities were developed from the same probability density $SID^{(1)}$, $SID^{(2)}$ of the speaker-independent model correspond. In the simplified case shown in FIG. 2 this correct assignment can also be seen with the naked eye from the position of the local maximums of the distributions of the individual observations of the speakers $S_1$, $S_2$. The problem becomes evident, however, when it is considered that with a real evaluation of training speech data, not two distributions in a two-dimensional space, but approximately 30 distributions in a 33-dimensional space can be assigned to one another, while the individual distributions of a state of a model are slightly overlapping.

This assignment method achieves that for each of the speakers there is a clear parameter assignment of each individual density, of each individual state and each individual model. Based on this known ordering, all the parameters for all the speakers can then be concatenated in one supervector per speaker, while it is ensured that in all the supervectors for all the speakers the same order of the parameters is present. With the aid of these supervectors, each individual speaker can be represented exactly as a dot in the high-dimensional model space, in the present example of embodiment an approximately $2 \times 10^6$-dimensional space. This model space contains all the information of the speaker variations during the training.

For effectively using the information for the speech recognition according to the invention, a reduction of the data set, more particularly, a reduction of the dimensions of the model space is necessary, without essential information being lost then. For this purpose, the eigenvoice method is used, in which a transformation is performed of the supervectors of the individual speakers to find the basis vectors of an eigenspace. With this transformation, reduction criterions are used, which are based on the mutual variability, for example, on the variance, of the vectors to be transformed. A possibility of the transformation is—as discussed in the introductory part—the Principal Component Analysis (PCA). Also other suitable methods such as the Linear Discriminant Analysis (LDA), the Factor Analysis (FA), the Independent Component Analysis (ICA) or the Singular Value Decomposition (SVD) can obviously be used.

In the following example of embodiment it is assumed that for finding the eigenspace basis vectors, a PCA transformation is performed i.e. the eigenvectors of a covariance matrix determined by means of the supervectors of the individual speakers and the associated eigenvalues are searched for. These eigenvectors then form the eigenspace basis vectors.

In the following detailed mathematical description of this method, the following notations are used:

$n_p$ is the number of the model parameters to be adapted; in the present example of embodiment the dimension of the attribute space (i.e. the number of the acoustic attribute parameters) multiplied by the total number of probability densities $n_s$ is the number of training speakers by which the training speech data were generated;

$$n_s \ll n_p$$

P is the model space i.e. the space of all the model parameters $n_p$, in the present example of embodiment they are all the mean values of all the probability densities in the attribute space. (Linear structures are used here.) This is to be taken into account when parameters to be adapted are represented. If, for example, variances σ are adapted, log (σ) is presented as a good coordinate to avoid transformations to very small or even negative values of σ. P has the structure of an affine euclidian space, which means that vectors of an $n_p$-dimensional vector space can be used to define translations into P in a natural way. The elements of P are simply underlined in the following. Linear mappings in this space are underlined twice.

$\underline{R}_i$ is an element of P (for example, a set of model parameters of a possible speaker), i.e. a supervector of a speaker; $i=1$ to $n_s$.

Instead of the covariance matrix of the supervectors themselves, the covariance matrix is determined of the difference vectors $\underline{D}_i$ of the supervectors to a "mean supervector" $\underline{R}_M$ of all the speakers.

Starting point for this is the determination of the mean value $\underline{R}_M$ for the supervectors of all the $\underline{R}_i$ of all the speakers:

$$R_M = \frac{1}{n_S} \sum_i R_i \quad (1)$$

This mean supervector $\underline{R}_M$ is, as shown in formula (1), a supervector of all the speakers averaged component by component and thus represents an average set of models of the individual speaker-dependent sets of models of the training speakers.

Subsequently, the deviations i.e. the difference vectors $\underline{D}_i$ of the individual supervectors $\underline{R}_i$ from this mean supervector $\underline{R}_M$ is determined:

$$\underline{D}_i = \underline{R}_i - \underline{R}_M \quad (2)$$

All further computations now take place with these difference vectors $\underline{D}_i$.

FIG. 2 shows in the method step shown bottommost for the two respective paired speaker-dependent densities $SDD^{(1)}_1$, $SDD^{(1)}_2$ and $SDD^{(2)}_1$, $SDD^{(2)}_2$ a mean density $MD^{(1)}$, $MD^{(2)}$. They are the densities $MD^{(1)}$, $MD^{(2)}$ that have the same variance as the speaker-dependent densities $SDD^{(1)}_1$, $SDD^{(1)}_2$, $SDD^{(2)}_1$, $SDD^{(2)}_2$. The mean value of these mean densities $MD^{(1)}$, $MD^{(2)}$ is the mean value of the mean values of the respective individual densities $SDD^{(1)}_1$, $SDD^{(1)}_2$ and $SDD^{(2)}_1$, $SDD^{(2)}_2$ of the two speakers $S_1$, $S_2$.

The covariance matrix $\underline{\underline{K}}$ of the difference vectors $\underline{D}_i$ is obtained from the multiplication of the vectors $\underline{D}_i$ as rows in an $n_s \times n_p$ matrix $\underline{\underline{D}}$ with its transformed $\underline{\underline{D}}^{tr}$:

$$\underline{\underline{K}} = \underline{\underline{D}}^{tr} \underline{\underline{D}} \quad (3)$$

The in general $n_s$ eigenvectors $\underline{E}_1, \ldots \underline{E}_{n_s}$ of this covariance matrix $\underline{\underline{K}}$ having eigenvalue>0 are the eigenspace basis vectors searched for as such. These PCA eigenvectors $n_s$ are the main axes of the covariance matrix $\underline{\underline{K}}$ or the "lethargy tensor". The eigenvectors each time correspond to the axes along which the individual speakers are distinguished from each other. Since the covariance matrix $\underline{\underline{K}}$ was built from the difference vectors $\underline{D}_i$ of the supervectors $\underline{R}_i$ formed to become the mean supervector $\underline{R}_M$, the eigenvectors $\underline{E}_1, \ldots \underline{E}_{n_s}$ run through the mean supervector $\underline{R}_M$, which forms the origin of the eigenspace.

For two dimensions, the directions of the eigenvectors in the lower part of FIG. 2 are illustrated. They run through the center of the mean densities $MD^{(1)}$, $MD^{(2)}$ formed by the two speaker-dependent densities $SDD^{(1)}_1$, $SDD^{(1)}_2$ and $SDD^{(2)}_1$, $SDD^{(2)}_2$ In the direction of connection direction of the two speaker-dependent densities $SDD^{(1)}_1$, $SDD^{(1)}_2$ and $SDD^{(2)}_1$, $SDD^{(2)}_2$, each belonging to a respective mean density $MD^{(1)}$, $MD^{(2)}$.

Since, however, such transformations as the computation of the eigenvectors of a covariance matrix in a substantially $2 \times 10^6$ dimensional space require extremely much computational circuitry and an enormous main memory capacity is necessary (to store the vectors and matrices for the necessary computation operations), these transformations can hardly be realized with the computers available at present. Therefore, a further step is necessary to reduce the space before the actual calculation of the eigenspace basis vectors.

For this purpose, first an orthonormal basis is searched for, which covers a sub-space (in the following also speaker sub-space) within the model space, in which sub-space all the difference vectors $\underline{D}_i$ are represented which belong to the individual speakers or their models, respectively. To find this orthonormal basis, a simple basis transformation is performed which requires relatively little computational circuitry. In the following example of embodiment the Gram-Schmidt orthonormalization method is chosen. Obviously, also another simple transformation method can be used for a change of basis, for example, a Löwdin transformation.

When the Gram-Schmidt orthonormalization method is executed, first one of the difference vectors, for example $\underline{D}_1$ is used as a first Schmidt basis vector $\underline{S}_1$ of the orthonormal basis searched for and only standardized. Subsequently, the second difference vector $\underline{D}_2$ is orthonormalized to this first Schmidt-basis vector $\underline{S}_1$ in that this second difference vector $\underline{D}_2$ is first projected on the first found Schmidt-basis vector $\underline{S}_1$ and the component parallel with the first Schmidt-basis vector $\underline{S}_1$ of the second difference vector $\underline{D}_2$ is subtracted from the second difference vector $\underline{D}_2$. The remaining component of the second difference vector $\underline{D}_2$, which component is perpendicular to the first Schmidt-basis vector $\underline{S}_1$, is then standardized and thus forms the second Schmidt-basis vector $\underline{S}_2$. Accordingly is done with these further difference vectors $\underline{D}_3$ to $\underline{D}_s$, while first all the components parallel with the already existing Schmidt-basis vectors $\underline{S}_1$ are subtracted and the component perpendicular thereto is standardized as a new Schmidt-basis vector $\underline{S}_3$ to $\underline{S}_s$.

Since also such an orthonormalization of 300 vectors in a dimensional space of about $2 \times 10^6$ cannot be performed without further measures because of the limited storage capacity in normal computers, in the concrete example of embodiment this orthonormalization is performed block by block. It is then assumed that the main memory of the computer is capable of simultaneously storing 2n-supervectors. The procedure is then as follows:

First the 2n-vectors $\underline{D}_{1 \ldots 2n}$ are orthonormalized and their representation is stored in the new found basis $\underline{S}_{1 \ldots 2n}$.

For each further block of n-vectors $\underline{D}_i$, first for each block of n orthonormalized Schmidt-basis vectors $\underline{S}_j$ which were already found, the projection of the $\underline{D}_i$ on this $\underline{S}_j$ is subtracted. The projection coefficients $\underline{D}_i$ in the orthonormal basis found are then stored for the representation of the $\underline{D}_i$ in the orthonormal basis. Subsequently, the rest, i.e. the perpendicular components are mutually orthonormalized. The newly found Schmidt-basis vectors $\underline{S}_j$ of the orthonormal basis and the representation coefficients of the individual difference vectors $\underline{D}_i$ in this basis are then again stored.

Such a Gram-Schmidt orthonormalization needs $$n_P \left( \frac{3}{2} n_S (n_S - 1) + n_S \right) \approx \frac{3}{2} n_S^2 n_P \quad (4)$$

floating point operations. They are, for example, with 300 speakers and 1 million dimensions, about $10^{11}$ individual operations, which can be carried out in about one to two seconds CPU time.

Since the difference vectors $\underline{D}_i$ are correlated via the mean supervector $\underline{R}_M$ according to the formulae (1) and (2), they are linearly dependent. Accordingly, an orthonormal basis vector is needed less than there are training speakers. This corresponds to the example to illustrate that three dots in a three-dimensional space can always be represented in a common plane i.e. also here a maximum of a two-dimensional sub-space is necessary for representing the three dots of the three-dimensional space. The saving of one dimension (since the degree of freedom for the information—here unessential anyway—of the position of the speaker relative to the absolute zero of the model space is saved) is a reason why in the present example of embodiment the difference vectors $\underline{D}_i$ of the speakers and not the supervectors $\underline{R}_i$ themselves are used for forming the speaker sub-space and for computing the covariance matrix. Furthermore, the coordinate jump in the eigenspace would otherwise be included, which, however, does not form a practical contribution to the speaker adaptation.

If desired, the supervector of the originally created common speaker-independent model can furthermore be represented for all the training speakers in this new Schmidt orthonormal basis. In this case the basis is naturally increased by one dimension. The dimension of the sub-space then corresponds to the number of speakers, because the common speaker-independent model is represented by its own supervector irrespective of the supervectors of the individual speakers, and thus represents an additionally mixed speaker which has an extremely large variance with regard to the individual acoustic units.

In lieu of the matrix $\underline{\underline{D}}$ of the distance vectors $\underline{D}_i$ in the complete model space, now the representations of the difference vectors $\underline{D}_i$ can be combined within the Schmidt orthonormal basis of the speech sub-space in rows for a matrix $\theta$. This matrix $\theta$ is an $n_s \times n_s$ matrix i.e. it has only 300 times 300 elements. In contrast, the matrix D of the difference vectors $\underline{D}_i$ in the original model space has 300 times about 2 million elements.

For the sought covariance matrix $\underline{\underline{K}}$ of the difference vectors $\underline{D}_i$ then holds $$\underline{\underline{K}} = \underline{\underline{D}}^{tr} \underline{\underline{D}} \quad (5)$$
$$= \underline{\underline{S}}^{tr} \underline{\underline{\theta}}^{tr} \underline{\underline{\theta}} \underline{\underline{S}}$$

where $\underline{\underline{S}}$ is an $n_s \times n_p$ matrix of the basis vectors $\underline{S}_i$ of the Schmidt orthonormal basis combined in rows. Since the basis vectors $\underline{S}_i$ are orthonormal, a diagonaling of $\underline{\underline{\theta}}^{tr} \underline{\underline{\theta}}$ an subsequent retransformation with the matrix $\underline{\underline{S}}$ is sufficient for finding the PCA eigenvectors $\underline{E}_1, \ldots \underline{E}_{n_s}$ in the model space. Since the vectors $\underline{D}_1$ themselves have led to the orthonormalization, the matrix $\theta$ of the representations of the difference vectors $\underline{D}_1$ in the Schmidt orthonormal basis is a triangular matrix, which renders the diagonaling of $\underline{\underline{\theta}}^{tr} \underline{\underline{\theta}}$ extremely simple.

The result is then an eigenspace whose dimension corresponds to the number of speakers −1, whose origin lies in the center of all original supervectors of the individual speakers and its basis vectors $\underline{E}_1, \ldots \underline{E}_{n_s}$ run along the variabilities of the individual speakers.

As an alternative, it is naturally also possible first to find an orthonormal basis of the supervectors themselves via a simple change of basis, for example, a Gram-Schmidt orthonormalization. This basis found in this manner may then be shifted in the origin to the mean value of all the supervectors and, subsequently, the PCA method is executed first for determining the eigenvectors. This method of forming a Schmidt orthonormal basis from the supervectors themselves, a subsequent averaging in the new basis and a subsequent implementation of the PCA method as well as the subsequent retransformation, is shown in FIG. 1 in the last three method steps.

Naturally, the PCA method can also be executed with the orthonormal basis of the supervectors found by the simple change of basis and, subsequently, a transformation to a desired origin. Furthermore, instead of the mean value of all the supervectors, also the supervector of the common speaker-independent model of all the training speakers may be used as the origin for the eigenspace.

The eigenspace found (and the representations of the speakers herein) is already considerably reduced compared to the original model space and still contains all information about the speaker variations in the training. However, it is still too complex to use during a rapid recognition. Therefore it is necessary for the dimension to be reduced more. This may be achieved in that simply several of the eigenvectors are rejected.

For this purpose, in the PCA method not only the eigenvectors, but also the associated eigenvalues of the covariance matrix $\underline{\underline{K}}$ may be determined. (eigenvalues are understood to mean in the sense of this document, unlike European patent application EP 0 984 429 A2 mentioned above, not the coefficients of a model when represented as a linear combination of the eigenvectors, but of the eigenvalue e belonging to the respective eigenvector $\underline{E}_e$ of the matrix $\underline{\underline{K}}$; for which holds: $\underline{E}_e \underline{\underline{K}} = e \underline{\underline{K}}$). These eigenvalues may be used for determining an order of the eigenvectors $\underline{E}_e$. The higher the eigenvalue, the more important the associated eigenvector $\underline{E}_e$ is for distinguishing between two different speakers. Therefore it is possible to select a certain number $n_E$ of the most important eigenvectors, which are actually to be used for spreading out an eigenspace for a speech recognition system. In an example of embodiment of the method already implemented, they are only the eigenvectors having the ten largest eigenvalues, in another example the eigenvectors having the 50 most important eigenvalues.

It is self-evident that then only these eigenvectors actually used for spreading out the eigenspace, the so-called eigenvoices $\underline{E}_e$, are to be retransformed into the model space and not all the eigenvectors found of the covariance matrix $\underline{\underline{K}}$. By selecting the basis for the eigenspace it is ensured that when a supervector $\underline{R}_i$ $\underline{R}_i$ is projected on the reduced eigenspace it is ensured that with a projection of a supervector $\underline{R}_i$ on the reduced eigenspace with only $n_E$ dimensions, having the original supervector $\underline{R}_i$, the resulting mean square error is minimized.

The eigenspace found in this manner may in principle be used in several ways to adapt a basic model to a new speaker in a suitable way and in the fastest possible way. So far this eigenspace can also be used as a complete data set in various speech recognition systems, which utilize a data in a different way for adapting a basic model to a new speaker, which data set already contains all the essential information of the training speech data in pre-evaluated manner.

In the present case the eigenspace is used as an a priori knowledge for building a probability distribution for the MAP method generalized according to the invention. In the following the adaptation method is described in more detail. The following notations are used here:

$n_E$ is the number of the eigenvectors (eigenvoices) used for the adaptation; $n_E < n_S$ $n_M$ is the number of the acoustic attribute parameters (components of the attribute vector) of a single mean probability density value $i(\tau)$ is the index of an observed probability density (as a component of a P-vectors) at time $\tau$ $\underline{\mu}_\tau$ is an observation at time $\tau$, represented as a vector in P. The $n_m$-acoustic attribute vectors $i(\tau)$ in P differ from 0, all other $n_p - n_M$-components are 0.

The following vectors are of the same type as $\underline{\mu}_\tau$:

$\underline{\mu}_i$ is the mean value of all the observations of the probability density i $\underline{\mu}_i^q$ is the mean value of the probability density in the target vector, for example, in the adaptation result $\underline{\mu}_i^0$ is the mean value of the probability density in the a priori vector, for example, the speaker-independent vector $\underline{E}_e$: is an eigenvoice i.e. an eigenvector for one of the $n_E$ largest eigenvalues e of the covariance matrix of the training speaker $$\beta = \frac{1}{\sigma^2};$$

$\sigma$ is the probability density variance which is here assumed to be roughly fixed and the same for all densities. To save several indices in the formulae, this density is to be independent of the acoustic attributes here too (normalized variance)

$$\alpha = \frac{1}{\sigma_0^2}$$

is the adaptation parameter for all the transformations which are orthogonal to the eigenvoices. $\sigma_0$ is the assumed variance of speakers in this direction and is therefore to be smaller than the observed eigenvoice variances. The variation parameter $\alpha$ in the normally used MAP method here corresponds to $$\frac{\beta}{\alpha}.$$

$$\varepsilon_e = \frac{1}{\sigma_e^2}$$

is the adaptation parameter for transformations parallel with the "eigenvoices" $\underline{E}_e$ The implementation of a MAP method means that an element $\underline{\mu}^q$ of the model space P is searched for, which maximizes the a posterioi probability of an observation X, i.e. the supervector is searched for, which supervector most probably corresponds to the observation X, while the probability $p(\underline{\mu}^q)$ of the supervector $\underline{\mu}^q$ occurring at all is taken into consideration. This can be represented in a formula as follows:

$$\underline{\mu}^q_{MAP} = \arg\max_{\underline{\mu}^q} p(X|\underline{\mu}^q)p(\underline{\mu}^q) \qquad (6)$$

As a probability $p(\underline{\mu}^q)$ in the normal MAP method a spherical symmetrical Gaussian density distribution is assumed i.e. the distribution has the same variance in every direction of the model space. Thus, in the event of an adaptation there is an equally fast adaptation in any direction of the model space.

In the more general MAP method according to the invention, an asymmetrical Gaussian probability density is selected instead, which is weighted differently in different directions:

$$p(\underline{\mu}^q) = N \prod_i \exp\left\{-\frac{1}{2}(\underline{\mu}_i^q - \underline{\mu}_i^0)\underbrace{\left(\alpha\underline{1} + \sum_e E_e^{tr}(\varepsilon_e - \alpha)E_e\right)}_{:=\underline{A}}(\underline{\mu}_i^q - \underline{\mu}_i^0)^{tr}\right\} \quad (7)$$

In the further explanations, this changed Gaussian distribution is started from. As is customary, only for such a Gaussian density can the ratios be derived exactly. In principle, however, also a Laplace distribution can be selected for which the following derivations can be assumed as an approximation.

Without the sum portion in the matrix $\underline{\underline{A}}$, the formula (7) would be reduced to a usual spherical symmetrical Gaussian distribution. The sum portion in the matrix A provides that all the vectors $\underline{\mu}$ in the model space are subdivided into components in the direction of an eigenvector $\underline{E}_e$, and in components perpendicular thereto. The components in the direction of the eigenvector $\underline{E}_e$ are weighted with the reciprocal $\epsilon_e$ of the respective eigenvector, all components perpendicular thereto with the factor $\alpha$.

Since $$\alpha \text{ equals } \frac{1}{\sigma_0^2} \text{ and } \varepsilon_e \text{ equals } \frac{1}{\sigma_e^2},$$

this means that the variance $\sigma$ of the distribution along an eigenvector $\underline{E}_e$ equals the root of the eigenvalue belonging to the eigenvector $\underline{E}_e$. This means that the larger the eigenvalue and the more significant the eigenvector, the larger the variance. Since the eigenvectors represent the most significant main directions within the model space along which speakers are distinguished, it is self-evident that the variance $\sigma_0$ in all other directions is selected to be smaller than the smallest eigenvoice variance $\sigma_0$. By putting the formula (7) into the general MAP formula, one obtains:

$$\underline{\mu}_{MAP}^q = \arg\max_{\underline{\mu}^q} p(X \mid \underline{\mu}^q) p(\underline{\mu}^q) \quad (8)$$

$$= \arg\max_{\underline{\mu}^q} N' \prod_{Obs.\tau} e^{-\frac{1}{2}(\underline{\mu}_{i(\tau)}^q - \underline{\mu}_\tau)\beta\underline{1}(\underline{\mu}_{i(\tau)}^q - \underline{\mu}_\tau)^{tr}} \prod_i e^{-\frac{1}{2}(\underline{\mu}_i^q - \underline{\mu}_i^0)\underline{A}(\underline{\mu}_i^q - \underline{\mu}_i^0)^{tr}}$$

$$= \arg\max_{\underline{\mu}^q} \sum_{Obs.\tau} (\underline{\mu}_{i(\tau)}^q - \underline{\mu}_\tau)\beta\underline{1}(\underline{\mu}_{i(\tau)}^q - \underline{\mu}_\tau)^{tr} + \sum_i (\underline{\mu}_i^q - \underline{\mu}_i^0)\underline{A}(\underline{\mu}_i^q - \underline{\mu}_i^0)^{tr}$$

The transition from the second to the third column of the formula (8) is possible, because instead of the argument which maximizes the product of all the e functions, equally well the argument can be searched for which minimizes the sum of all the arguments of the e functions.

The necessary condition for the minimum searched for is that the derivative relating to a variation parameter $\epsilon$ disappears:

$$\underline{\mu}^q \rightarrow \underline{\mu}^q + \epsilon\Delta\underline{\mu}^q \quad (9)$$

Here $\epsilon=0$ holds for all the thicknesses i and any $\Delta\underline{\mu}^q$.

According to the bottom line of formula (8), in the first part a summation of all the previous observations $\tau$—referenced "Obs. $\tau$"—takes place. When a speaker has spoken, for example, for one second, about 100 different observations are recorded. Then a summing takes place of all these 100 observations. They are random observations and the individual observed densities then occur in the order in which they have been spoken by the speaker.

For the further adaptation method the occurrence of each individual density j in all the observations occurred so far is counted:

$$N_j = \sum_{Obs.i(\tau)=j} 1 \quad (10)$$

$N_j$ is, in consequence, the number of times a probability density j has so far been observed in the speech data of the new speaker.

Furthermore, the mean value of each observed density j during the previous observations is determined:

$$N_j \underline{\bar{\mu}}_j := \sum_{Obs.i(\tau)=j} \underline{\mu}_\tau \quad (11)$$

The derivative of the bottom line of formula (8) relating to the variation parameter $\epsilon$ and the substitution of the summing of all the observations $\tau$ by a summing of the various densities i leads to the following formula:

$$\sum_i \left[ N_i \beta(\underline{\mu}_i^q - \underline{\bar{\mu}}_j)\underline{1} + \alpha(\underline{\mu}_i^q - \underline{\mu}_j^0)\underline{1} + \sum_e (\varepsilon_e - \alpha)(\underline{\mu}_i^q - \underline{\mu}_i^0)E_e^{tr}E_e \right] \quad (12)$$

$$\Delta\underline{\mu}^{qtr} = 0$$

In general the formula $$\underline{v}^\perp = \underline{v}\underbrace{\left(\underline{1} - \sum_e E_e^{tr} E_e\right)}_{:=\underline{\underline{P}}} \quad (13)$$

holds for determining a portion $\underline{v}^\perp$ of a vector perpendicular to an eigenvector $\underline{E}_e$.

The operator $\underline{\underline{P}}$ then projects on a space which is orthonormal to all the eigenvectors $\underline{E}_e$. This operator also occurs in formula (12). It eliminates there all the portions containing the projector $$\sum_e E_e^{tr} E_e$$

The remaining portions can, as is customary, i.e. as in customary MAP methods, be divided into components. By putting the projector $\underline{\underline{P}}$ of the general formula (13) in formula (12), one obtains:

$$[N_i\beta(\underline{\mu}_i^q - \underline{\bar{\mu}}_i) + \alpha(\underline{\mu}_i^q - \underline{\mu}_i^0)]\underline{\underline{P}} = 0 \; \forall i \quad (14)$$

Except for the additional projector $\underline{\underline{P}}$, this corresponds to the standard MAP method.

The solution of formula (14) is unambiguous except for the components parallel to the eigenvectors $\underline{E}_e$. A special solution of formula (14) is obtained in that the term inside the hooked brackets is set to 0. This corresponds to the known customary MAP solution:

$$\underline{\tilde{\mu}}_i^q = \frac{1}{N_i\beta + \alpha}(N_i\beta\underline{\bar{\mu}}_i + \alpha\underline{\mu}_i^0) = \underline{\mu}_i^0 + \left(1 - \frac{1}{1 + \frac{\beta}{\alpha}N_i}\right)(\underline{\bar{\mu}}_i - \underline{\mu}_i^0) \quad (15)$$

Since the projection on the eigenspace has already been separated from this expression, the complete solution of the original system of equation (14) looks as follows:

$$\underline{\mu}^q = \underline{\mu}^0 + (\underline{\tilde{\mu}}^q - \underline{\mu}^0)\underline{\underline{P}} + \sum_e \chi_e \underline{E}_e \quad (16)$$

In this formula the first summand on the right-hand side corresponds to the start value (start supervector), the second summand contains the portions perpendicular to the eigenvectors $\underline{E}_e$ and the last summand the portions parallel with the eigenvectors $\underline{E}_e$. The first and second summands of the solution (16) are known because $\underline{\mu}^0$ is known and $\underline{\tilde{\mu}}^q$ can be determined according to formula (15). Only the coefficients $\chi_e$ of the last summand on the left-hand side of formula (16) are still to be determined to determine the complete solution.

To obtain these remaining $n_e$ unknown factors, the variation equation (14) is now projected on an eigenvector $\underline{E}_f$, i.e. the eigenvector $\underline{E}_f$ is selected as "a random" variation direction $\Delta\underline{\mu}^q$ in the equations (9) and (16). Again the projection leads to a simplification of the formula (16), but the system is this time not decomposed into independent components for individual densities. Since the scalar product $\underline{E}_j \cdot \underline{E}_e = 0$ for all $e \neq j$, the last sum in the formula (16) disappears except for the cases where e=j. Thus one obtains:

$$\sum_i [N_i\beta(\underline{\mu}_i^q - \underline{\bar{\mu}}_i) + \varepsilon_f(\underline{\mu}_i^q - \underline{\mu}_i^0)]\underline{E}_f^{tr} = 0 \; \forall \; f \quad (17)$$

This expression may now be used to determine the sought coefficients $\chi_e$ in formula (16) in that the formulation of formula (16) is used in formula (17). This leads to a system of equations with $n_e$ unknowns. If then $\underline{\underline{N}}$ is the diagonal matrix which has the number of observations $N_i$ of the corresponding densities i as components, this leads to the formula:

$$0 = \left[\beta\left(\sum_e \chi_e \underline{E}_e + \underline{\mu}^0 + (\underline{\tilde{\mu}}^q - \underline{\mu}^0)\underline{\underline{P}} - \underline{\bar{\mu}}\right)\underline{\underline{N}} + \varepsilon_f \sum_e \chi_e \underline{E}_e\right]\underline{E}_f^{tr}$$

$$= \left[\sum_e \chi_e \underbrace{(\beta\underline{E}_e \underline{\underline{N}} \underline{E}_f^{tr} + \delta_{ef}\varepsilon_f)}_{:=B_{ef}}\right] - \underbrace{\beta(\underline{\bar{\mu}} - \underline{\mu}^0 - (\underline{\tilde{\mu}}^q - \underline{\mu}^0)\underline{\underline{P}})\underline{\underline{N}}\underline{E}_f^{tr}}_{:=a_f} \quad (18)$$

The transition from the first to the second line of this formula (18) is only a resorting of the summands in portions having a factor $\chi_e$ and in the remaining portions. Both e and j run from 1 to $n_e$.

With combinations of the unknowns $\chi_e$ to a vector (only $n_e$-dimensional), this equation may also be written in the form of $$\underline{x} = \underline{a}\underline{\underline{B}}^{-1} \quad (19)$$

This is a linear equation system with few unknowns $\chi_e$ which can be solved without any problem. For forming this equation system, only the matrix $\underline{\underline{B}}$ and the vector $\underline{a}$ are to be determined.

When the matrix $\underline{\underline{B}}$ is determined, only 100 to 1000 most frequently seen densities are used in the practical computation within the terms ($\underline{E}_e \; \underline{\underline{N}} \; \underline{E}_f^{tr}$) to reduce the number of floating point operations. This is possible without any problem, because the number of occurrences of the individual densities are counted anyway according to formula (9) and, therefore, the densities can be sorted according to frequency of occurrence. The middle part of the components $\alpha_f$ in formula (18) is to be computed only once and can then be used both for the formula (18) and for the mean summands of the formula (16). This means that also this computation is made only once and is accordingly stored in the computer.

In the end the formulas (15), (16) and (19) allow the explicit determination of the parameters which maximize the observation probability while the given asymmetrical Gaussian-distributed speaker variability is taken into account. The use of the bottom part of formula (18) in formula (19) and the use of this formula and the formula (15) in formula (16) leads to the following overall formula:

$$\underline{\mu}^q = \underline{\mu}^0 + \left[\sum_i \left(1 - \frac{1}{1 + \frac{\beta}{\alpha}N_i}\right)(\underline{\bar{\mu}}_i - \underline{\mu}_i^0)\right]\left(\underline{\underline{1}} - \sum_e \underline{E}_e^{tr}\underline{E}_e\right) + \sum_e \chi_e\underline{E}_e \quad (20)$$

$$= \underline{\mu}^0 + \beta(\underline{\bar{\mu}} - \underline{\mu}^0)\underline{\underline{N}}\left[\beta\underline{\underline{N}} + \alpha\underline{\underline{1}}\right]^{-1}\left(\underline{\underline{1}} - \underline{\underline{E}}^{tr}\underline{\underline{E}}\right) +$$

$$\beta(\underline{\bar{\mu}} - \underline{\mu}^0)\underline{\underline{N}}\underline{\underline{E}}^{tr}\left[\beta\underline{\underline{E}}\underline{\underline{N}}\underline{\underline{E}}^{tr} + \underline{\underline{\varepsilon}}\right]^{-1}\underline{\underline{E}} -$$

$$\beta^2(\underline{\bar{\mu}} - \underline{\mu}^0)\underline{\underline{N}}\left[\beta\underline{\underline{N}} + \alpha\underline{\underline{1}}\right]^{-1}\left(\underline{\underline{1}} - \underline{\underline{E}}^{tr}\underline{\underline{E}}\right)\underline{\underline{N}}\underline{\underline{E}}^{tr}\left[\beta\underline{\underline{E}}\underline{\underline{N}}\underline{\underline{E}}^{tr} + \underline{\underline{\varepsilon}}\right]^{-1}\underline{\underline{E}}$$

The first column of formula (20) is suitable for practical applications to calculate $\underline{\mu}^q$. This is an iterative formula with which—starting from a start model or its representation, respectively, as a supervector $\underline{\mu}^0$ in the model space—a new model better resembling the speaker's utterances, which model is represented by the supervector $\underline{\mu}^q$ in the model space, is represented per iteration step.

The further lines in formula (20) are written without indices and hold for arbitrary sets of orthonormal vectors $\{\underline{E}_e\}$. The $n_E \times n_p$-matrix $\underline{\mu}^0$ contains the basic vectors as lines; the $n_E \times n_E$-matrix $\underline{\underline{\varepsilon}}$ is the inverse covariance matrix of the speaker in this sub-space (which matrix is diagonal only in the special coordinate system which was selected for formula (20)). A comparison of the expressions with the second line of formula (20), which holds for the normal, usual MAP solution, and the third and fourth lines of formula (20) for the eigenvoice modification, shows its analogy. In the second case there is a transformation to the sub-space basis E and the variance matrix $\alpha \underline{1}$ is generalized by the matrix $\underline{\underline{\epsilon}}$.

In the above derivations it was assumed that only the mean values of the probability densities are used in the attribute space as parameters. Needless to observe that also additional parameters, for example the variances of the probability densities may be added thereto. In addition it is also possible, for reducing the computational circuitry, to neglect certain terms in the equations, which terms are very small compared to other terms.

FIG. 3 shows in a simple diagram in only one plane the step-by-step adaptation by means of the generalized MAP method (curve 1) according to the invention compared to the usual MAP method (curve 2). The basic model AM is then adapted to the actual new speaker NS. Basic model is then preferably the mean speaker model of all the training speakers i.e. the origin of the eigenspace developed according to the invention. As can clearly be seen, the adaptation in the generalized MAP method 1 is effected in the direction of an eigenvector $\underline{E}_e$ with a considerably larger speed than in directions perpendicular to this eigenvector $\underline{E}_e$. In the customary MAP method the adaptation in the two directions takes place with an isotropic speed. This leads for the general MAP method with the same number of steps to a considerably faster coming near to the actual speaker NS.

As an alternative, in lieu of the mean speaker model, also the common speaker-independent model of the training speakers can be used as a basic model. As a further alternative may be used a linear combination of the two models as a basic model. Furthermore, the connecting axis between the mean speaker model and the common speaker-independent model can be used as further, additional preferred direction in the general MAP a priori distribution. With the previous tests of a model to be adapted to a new speaker while the eigenvectors found were used, better results were obtained, however, when the mean value of all the supervectors of the individual speakers was chosen as a basic model, than when the supervector of the common speaker-independent model was chosen as a basic model.

The method according to the invention has already been used successfully for gender-independent and gender-dependent models with 27,000 or 55,000 densities and 10 or 50 eigenvectors, respectively. An adaptation to an unknown language led to a 10 to 16% relative improvement of the word error rate after several seconds of speech entries.

Already one second (or only two words) may lead to a degradation of the word error rate of 5% when the generalized MAP method according to the invention and illustrated in the above example of embodiment is used while the basis vectors of the spread out eigenspace are used.

What is claimed is:

1. A speech recognition method in which a basic set of models, which comprises models for various acoustic units, while the models are described by a plurality of model parameters, is adapted to a current speaker based on already observed speech data of this speaker,
characterized
in that the basic set of models is represented by a supervector in a high-dimensional vector space (model space), where the supervector is formed by concatenation of the plurality of model parameters of the models of the basic set of models, and this basic set of models in the model space is adapted to the speakers by means of a MAP method, while an asymmetrical distribution in the model space is chosen as an a priori distribution for the MAP method.

2. A method as claimed in claim 1,
characterized
in that the a priori distribution is an asymmetrical Gaussian distribution.

3. A method as claimed in claim 1,
characterized
in that the a priori distribution is chosen so that an adaptation in certain preferred directions in the model space takes place faster than perpendicularly to these preferred directions.

4. A method as claimed in claim 3,
characterized
in that the a priori distribution in the direction of preferred directions and perpendicularly thereto has different variances.

5. A method as claimed in claim 1,
characterized
in that the preferred directions are chosen such that they represent the main directions within the model space along which the different speakers can be distinguished from each other.

6. A method as claimed in claim 5,
characterized
in that the preferred directions run along certain eigenspace basis vectors ($\underline{E}_e$) of an eigenspace, which was determined based on training speech data of a plurality of training speakers.

7. A method as claimed in claim 6,
characterized
in that associated order attributes are determined for the eigenspace basis vectors ($\underline{E}_e$).

8. A method as claimed in claim 6,
characterized
in that the eigenspace is determined in the following steps:
development of a common speaker-independent set of models for the training speakers while training speech data of the training speaker are used,
adaptation of the speaker-independent set of models to the individual training speaker to develop the speaker-dependent set of models while the respective training speech data of the individual training speakers are used,
establishing the assignment of the model parameters of the models (SI) of the speaker-independent set of models to the model parameters of the models (SD) of the speaker-dependent sets of models when the speaker-independent set of models are adapted to the individual training speakers,
showing a combined model for each speaker in a high-dimensional vector space by concatenation of a plurality of the model parameters of the models of the sets of models of the individual training speakers to a respective coherent supervector, where the concatenation of the plurality of model parameters of the individual sets of models to the supervectors is effected so that the model parameters of the models (SD) of the speaker-dependent sets of models, which are assigned to the same model parameters of the same model (SI) of the speaker-independent set of models are arranged at the respective positions of the respective supervectors, performing a change of basis to reduce the model space to a speaker sub-space in which all the training speakers are represented, performing a transformation of the vectors representing the training speakers in the speaker sub-space to gain eigenspace basis vectors ($\underline{E}_e$) while the transformation utilizes a variability of the reduction criterion based on the vectors to be transformed.

9. A method as claimed in claim 8, characterized in that the basis of this speaker sub-space of orthogonalized difference vectors of the supervectors of the individual training speakers is spread out to a mean supervector.

10. A method as claimed in claim 1, characterized in that a set of mean models of speaker-dependent sets of models of the training speakers is used as a basic set of models.

11. A method as claimed in claim 10, characterized in that the eigenspace basis vectors are the eigenvectors of a correlation matrix determined by the supervectors and the order attributes are the eigenvalues belonging to the eigenvectors.

12. A computer program with program code means for carrying out all the steps of a method as claimed in claim 1 when the program is executed on a computer.

13. A computer program with program code means as claimed in claim 12 which are stored on a computer-readable data carrier.

14. A method for speech recognition, comprising the steps of:

receiving speech data corresponding to a current speaker;

providing a basic set including at least one model for at least one acoustic unit, wherein each model comprises a plurality of model parameters;

forming a supervector in a high-dimensional vector space by concatenating the plurality of model parameters, wherein the supervector represents the basic set, choosing an asymmetrical distribution in the high-dimensional vector space as an a priori distribution for a MAP method; and adapting the models based on the speech data using the MAP method.

* * * * *